Figure 3:
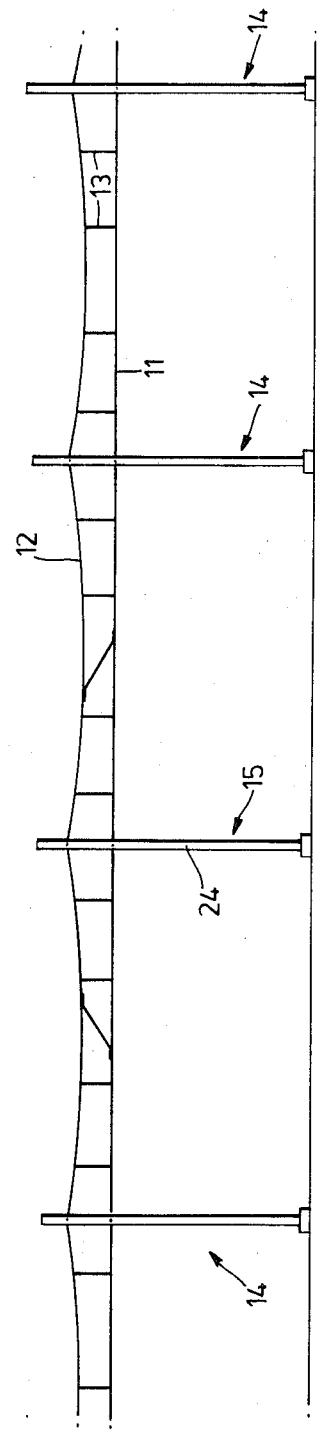

United States Patent [19]

Seddon et al.

[11] Patent Number: 4,679,672

[45] Date of Patent: Jul. 14, 1987

[54] OVERHEAD ELECTRIC TRACTION SYSTEM FOR RAILWAYS

[75] Inventors: Alan E. Seddon, Rainford; John Doughty, Wigan, both of England

[73] Assignee: BICC Public Limited Company, London, England

[21] Appl. No.: 824,076

[22] Filed: Jan. 30, 1986

[30] Foreign Application Priority Data

Jan. 30, 1985 [GB] United Kingdom ............... 8502336

[51] Int. Cl.[4] .................. B60M 1/22; E04C 3/02; H02G 7/20
[52] U.S. Cl. ..................................... 191/41; 191/40; 52/40; 52/697; 174/45 R; 248/70
[58] Field of Search ............ 174/40 R, 45 R; 191/40, 191/41; 52/40, 697; 248/65, 70, 219.1, 219.4, 548

[56] References Cited

U.S. PATENT DOCUMENTS 3,644,688  2/1972  Tustin et al. .................. 191/40

FOREIGN PATENT DOCUMENTS

| 114075 | 8/1929 | Austria ................... 191/41 |
| 220578 | 4/1910 | Fed. Rep. of Germany ........ 191/41 |
| 470855 | 1/1929 | Fed. Rep. of Germany ........ 191/40 |
| 494225 | 3/1930 | Fed. Rep. of Germany ........ 174/45 |
| 608282 | 1/1935 | Fed. Rep. of Germany ........ 191/40 |
| 658973 | 4/1938 | Fed. Rep. of Germany ........ 191/40 |
| 911618 | 6/1954 | Fed. Rep. of Germany ........ 191/40 |
| 124082 | 9/1980 | Japan ................... 174/45 R |
| 79031 | 6/1981 | Japan ................... 191/40 |
| 824137 | 11/1959 | United Kingdom ............... 191/40 |

Primary Examiner—Randolph A. Reese
Assistant Examiner—John G. Pido
Attorney, Agent, or Firm—Eugene F. Buell

[57] ABSTRACT

In an overhead electric traction system a simple and inexpensive mid-point anchor comprises a mast and, mounted on the upper part of the mast, a cantilever structure comprising a pair of rigid elongate members which lie in a common plane and extended transversely with respect to and lie spaced apart in a direction lengthwise of the track, and which at their ends nearer the track are connected to the mast by a third transversely extending elongate member inclined at an acute angle to the common plane. The ends of the members remote from the track are connected to opposite ends of a rigid bar which extends lengthwise of the track, which is pivotally connected to the mast about a vertical axis and which, at each of its end portions, is connected to the mast by a flexible tie. In the event of an unbalanced load on the catenary, pivotal movement of the cantilever structure about the vertical axis is prevented by one of the flexible ties and the out of balance load is transferred to the mast as a torsional load.

5 Claims, 8 Drawing Figures

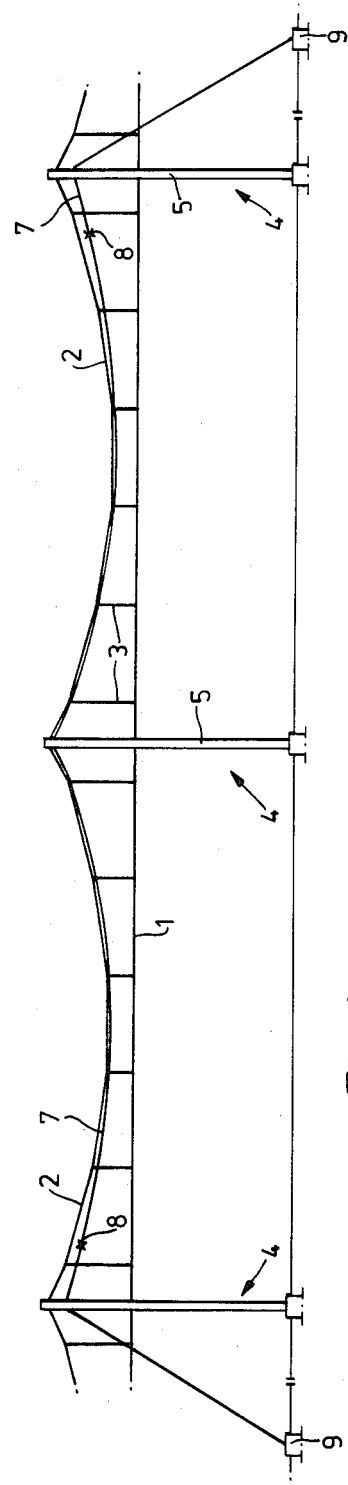
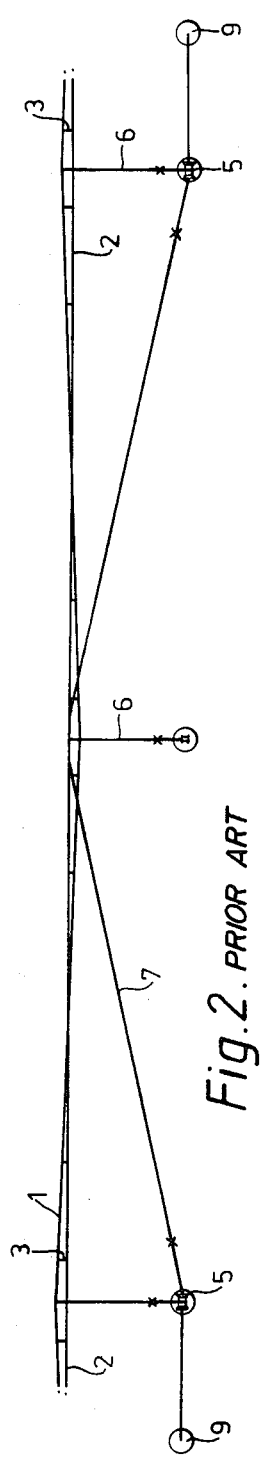
Fig.1. PRIOR ART
Fig.2. PRIOR ART

OVERHEAD ELECTRIC TRACTION SYSTEM FOR RAILWAYS

This invention relates to overhead electric traction systems of the kind in which a contact wire, from which current may be collected by a current collector of the bow or pantograph type mounted on a vehicle, is directly and/or indirectly supported at spaced positions along its length by supporting structures located at spaced positions along the length of the track or route along which said vehicle travels. For overhead electric traction systems where only a single track or route or a double track or route is involved, a form of supporting arrangement in use is a structural assembly comprising a mast or other upstanding support positioned alongside the track or route and, mounted on an upper part of the upstanding support, a cantilever structure which overhangs the track or route and from which the contact wire is suspended. Structural assemblies of this kind will hereinafter, for convenience, be referred to as "cantilever structural assemblies of the kind described".

The invention is especially, but not exclusively, concerned with overhead electric traction systems of the aforesaid kind for railways in which a contact wire is supported at spaced positions along its length by droppers from a catenary which is strung between cantilever structural assemblies of the kind described located at spaced positions along the length of the track or by droppers from an auxiliary catenary suspended from a main cantenary strung between cantilever structural assemblies of the kind described, but it is to be understood that the invention is also applicable to overhead electric traction systems in which a contact wire is supported at spaced positions along its length by cantilever structural assemblies of the kind described above a track of a tramcar or a route of a trolleybus or other vehicle.

In overhead electric traction systems of the aforesaid kind for railways in which cantilever structural assemblies of the kind described are employed and in which sections of the catenary, or if main and auxiliary catenaries are used of the main catenary, are each maintained under tension by balance weights supported by the masts or other upstanding supports of cantilever structural assemblies at the ends of the section, it is the general practice to provide for accommodation of out of balance (unbalanced) loads to which the catenary, or main catenary, in each section may be subjected whilst in service arising from changes in temperature and/or in the wind and/or from differences in level along the length of the system, in order to prevent movement in a direction along the track of the catenary or main catenary. For this purpose, at approximately the middle region of each section, an anchor is provided which will prevent movement in a direction along the track of the catenary or main catenary, such an anchor generally and hereinafter being referred to as 'a mid-point anchor'. A form of mid-point anchor in common use comprises at least one length of metal cable which is directly or indirectly secured to the catenary, or to the main catenary, on each side of a cantilever structural assembly at approximately the mid-point of the section and which extends towards and is secured to the mast or other upstanding support of each adjacent cantilever structural assembly from where it extends to a foundation anchor on the side of said adjacent cantilever structural assembly remote from the cantilever structural assembly at the mid-point of the section. Whilst this known form of mid-point anchor is satisfactory in operation, it has the major disadvantages that it requires several tens of metres of metal cable; insulators must be interconnected in the metal cable on each side of the cantilever structural assembly at the mid-point of the section to insulate the cable from each adjacent cantilever structural assembly; the masts or other upstanding supports of the adjacent cantilever structural assemblies must be substantially heavier than the masts or other upstanding supports of the other cantilever structural assemblies in order to be capable of withstanding the forces to which they will be subjected; and, at each end of the metal cable, a foundation anchor must be provided. As a consequence, this known form of mid-point anchor is expensive.

It is an object of the present invention to provide, in an overhead electric traction system of the aforesaid kind in which cantilever structural assemblies of the kind described are employed and in which sections of the conductor, or if the conductor is supported from a catenary or twin catenaries sections of the catenary or catenaries, or if main and auxiliary catenaries are used sections of the main catenary, are each maintained under tension by balance weights supported by the masts or other upstanding supports of cantilever structural assemblies at the ends of the section, an improved mid-point anchor which is simple in construction and substantially less expensive than mid-point anchors hitherto proposed and used.

According to the invention, at approximately the mid-point of at least one section of the overhead electric traction system there is provided an improved mid-point anchor comprising a mast or other upstanding support positioned alongside the track or route and, mounted on an upper part of the upstanding support, a cantilever structure comprising a pair of substantially rigid elongate members which lie in a substantially common plane and extend transversely with respect to and are spaced apart in a direction lengthwise of the track or route, which at their ends nearer the track or route are connected to said upstanding support by a third transversely extending elongate member inclined at an acute angle to said common plane, and which at their ends remote from the track or route are connected to opposite ends of a substantially rigid elongate member which extends lengthwise of the track or route, which is pivotally connected to the upstanding support about a substantially vertical axis and which, at each of its end portions, is connected to said upstanding support by an elongate element, the arrangement being such that, in the event of an out of balance load on the conductor, on the catenary, or on the main catenary, pivotal movement of the cantilever structure about a substantially vertical axis is prevented by one of the elongate elements and the out of balance load is transferred to the upstanding support as a torsional load.

In practice, the mast or other upstanding support on which the cantilever structure of the improved mid-point anchor is mounted may be heavier than the masts or other upstanding supports of the other cantilever structure assemblies of the system because this mast or other upstanding support has to withstand the torsional load tranferred to it in the event of an out of balance load on the conductor, on the catenary, or on the main catenary. Other than the heavier mast, the only other major components required in the cantilever structure of the improved mid-point anchor as compared with the conventional cantilever structures of the system are an additional transversely extending substantially rigid elongate member, the rigid member to which the pair of transversely extending rigid elongate members are connected, and the pair of elongate elements, e.g. flexible ties, each of which is probably no more than a meter in length. As a consequence, the improved mid-point anchor is simpler in construction and substantially less expensive than mid-point anchors hitherto proposed and used.

In an overhead electric transmission system of the aforesaid kind for a railway, preferably said pair of transversely extending substantially rigid elongate members of the cantilever structure of the improved mid-point anchor lie in a substantially horizontal plane and the third transversely extending elongate member is an inclined strut whose lower end is connected to said upstanding support and whose upper end, which lies above the adjacent track, is connected to the ends of the pair of elongate members. The catenary or twin catenaries, or if the main and auxiliary catenaries are used the main catenary, may be attached to the upper end of the inclined strut or to the outer ends of the pair of substantially horizontally extending elongate members and the contact wire, or in cases where an auxiliary catenary is used the contact wire and the auxiliary catenary, may each be attached to one end of a substantially horizontally extending registration arm, the other end of which is attached to the inclined strut or to the mast or other upstanding support.

Preferably, as is the practice with the known form of mid-point anchor hereinbefore described in an overhead electric traction system for a railway, at an intermediate region of each of the spans adjacent the mid-point anchor, the catenary or twin catenaries is or are connected to the contact wire by a flexible tie or other means, or the main catenary is connected to the auxiliary catenary and the auxiliary catenary is connected to the contact wire by flexible ties or other means, to provide for transmission of out of balance loads on the contact wire to the catenary or catenaries.

In an overhead electric traction system of the aforesaid kind for a tramcar or trolleybus system, preferably said pair of transversely extending substantially rigid elongate members of the cantilever structure of the improved mid-point anchor lie in a common plane which is inclined at an acute angle to the horizontal, said third transversely extending elongate member is a tie member which connects the upper ends of said pair of inclined elongate members to the mast or other upstanding support, and the contact wire or twin contact wires is or are suspended from each elongate member of said pair of elongate members by a flexible tie, known as a bridle, or by other means. The contact wire or twin contact wires may be attached to one end of a substantially horizontally extending registration arm, the other end of which is attached to a longitudinally extending substantially rigid elongate member connected between said pair of inclined elongate members intermediate of their ends.

In all cases, preferably an electric insulator is interconnected between the inner end of each of the transversely extending substantially rigid elongate members and the longitudinally extending elongate member which is pivotally connected to the mast or other upstanding support, and between the inner end of the third transversely extending elongate member and the mast or other upstanding support. An electric insulator may also be interconnected between the inner end of the registration arm and that part of the cantilever structure or mast or other upstanding support to which the registration arm is attached.

Preferably, the registration arm of the cantilever structure of the improved mid-point anchor is so attached to the cantilever structure or to the upstanding support that it is free to pivot about any axis. In some cases, the registration arm may be made in two parts to provide for transverse lateral adjustment of the contact wire relative to the track or route, for instance for the purpose of staggering the contact wire to reduce localised wear of the current collector of a vehicle.

The improved mid-point anchor will deal with a broken contact wire condition or a broken catenary condition as efficiently as mid-point anchors hitherto proposed and used. Where the broken wire condition arises from a simple break in the contact wire or catenary without the imposition of an increase in tension before failure, the balance weight auto-stop normally provided in practice will be actuated almost instantaneously. At the instant before the auto-stop is actuated, a difference in tension will be present and this difference in tension will be sufficient to cause one of the flexible ties or other elongate elements of the cantilever structure of the improved mid-point anchor to fail, thus relieving the mast or other upstanding support on which the cantilever stucture is mounted of its torsional load. Damage anticipated from this form of broken wire condition will be slight and is estimated to be confined within two or three spans. Where a broken contact wire or broken catenary condition is of a form which produces an increase in tension in the contact wire or catenary which exceeds its breaking load before failure—as may be the case where a vehicle 'hooks up' on the contact wire or catenary—one of the flexible ties orother elongate elements securing the cantilever structure of the improved mid-span anchor to the mast or other upstanding support will fail and the cantilever structure will swing towards the side of increased tension. The increase in tension will be absorbed by the cantilever structure until it has reached its limit of swing when the contact wire or catenary will fail. The balance weight auto-stop will then be actuated almost instantaneously.

Damage arising from this second broken wire condition will obviously be extensive, but will be no greater than that obtained for the same broken wire condition when mid-point anchors of forms hitherto used are employed.

Figure 4:
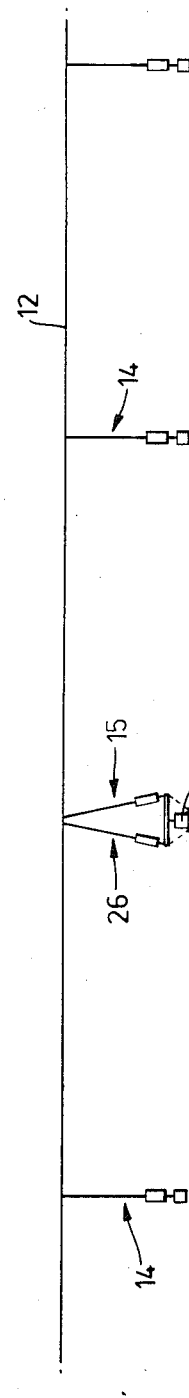
Figure 5:
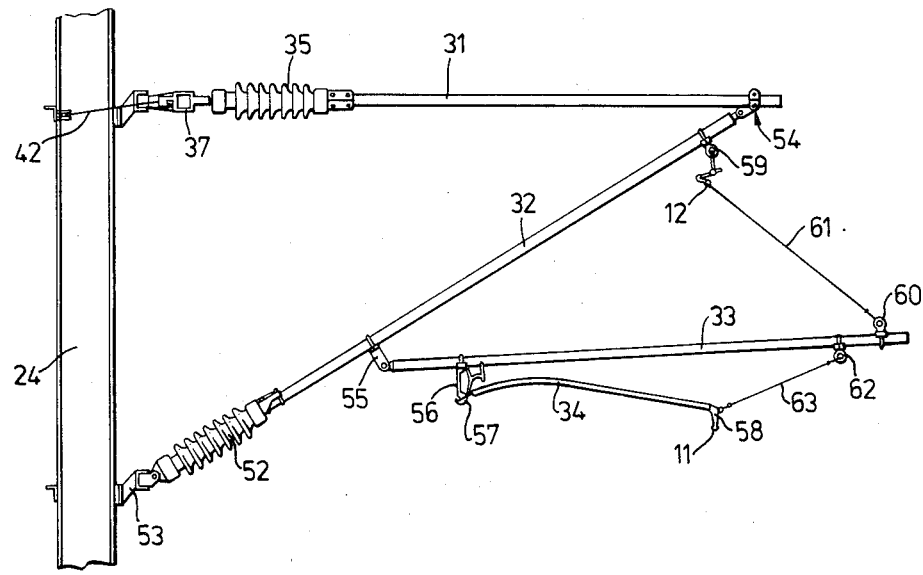
Figure 6:
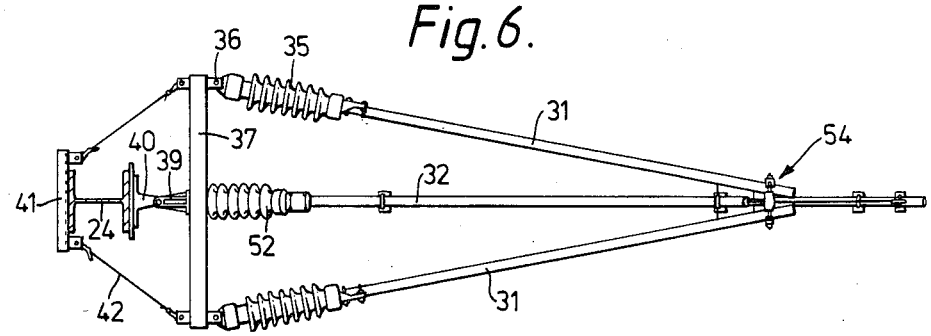
Figure 7:
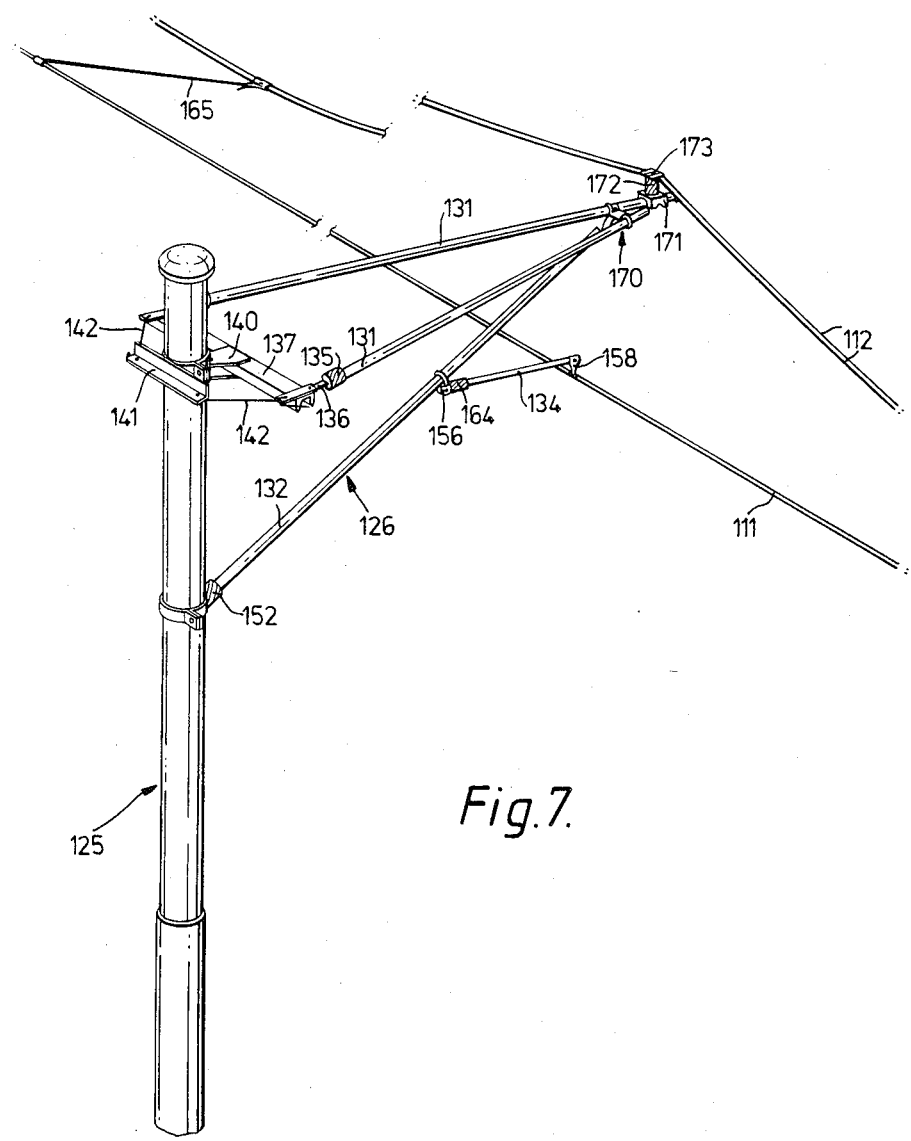
Figure 8:
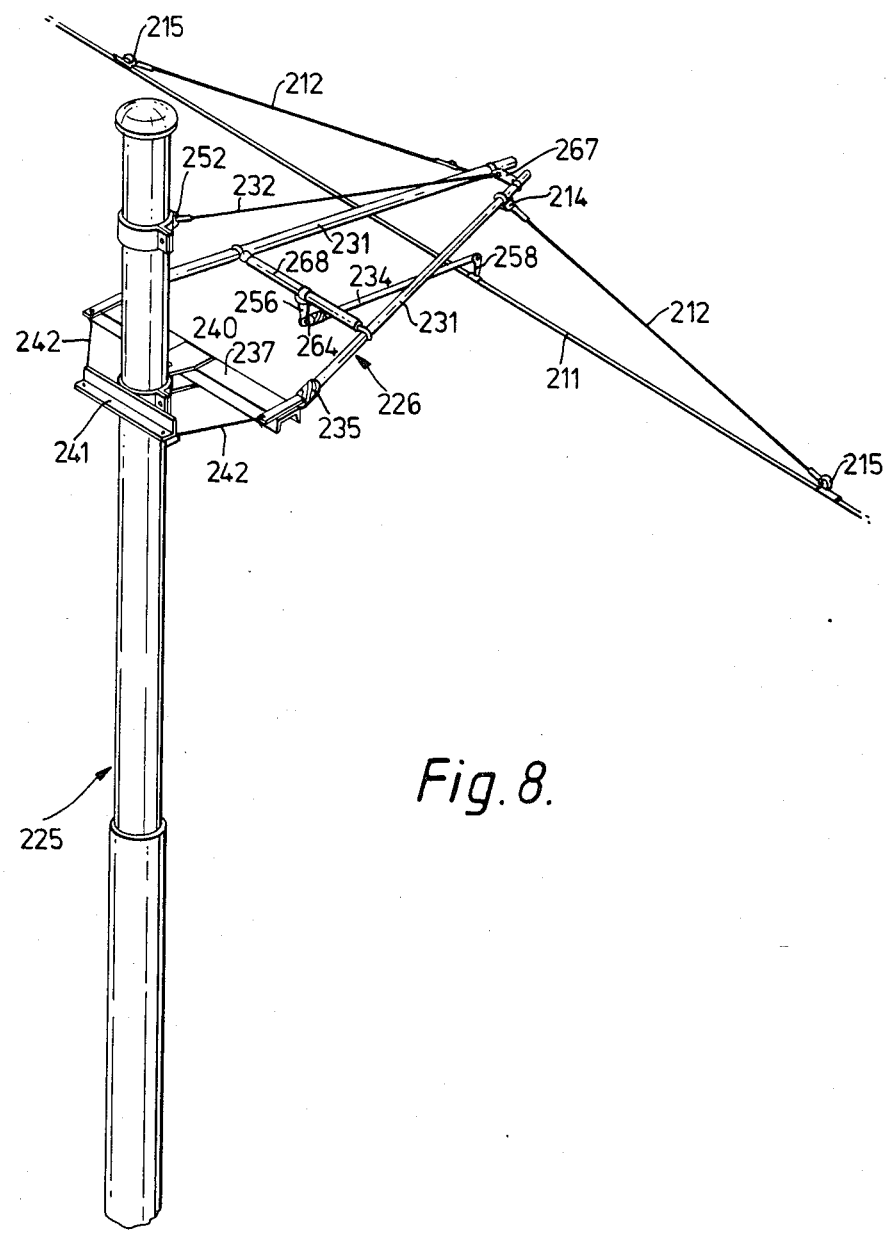

The invention is further illustrated by a description, by way of example, of three preferred forms of the improved mid-point anchor with reference to the accompanying drawings, in which:

FIGS. 1 and 2, respectively, are fragmental side and plan views of one known form of mid-point anchor;

FIGS. 3 and 4, respectively, are fragmental side and plan views of a first preferred form of the improved mid-point anchor;

FIGS. 5 and 6, respectively, are fragmental side and plan views of the cantilever structure of the first form of improved mid-point anchor shown in FIGS. 3 and 4;

FIG. 7 is a pictorial view of the cantilever structure of a second preferred form of the improved mid-point anchor, and FIG. 8 is a pictorial view of the cantilever structure of a third preferred form of the improved mid-point anchor.

Referring to FIGS. 1 and 2, an overhead electric traction system for a railway comprises a contact wire 1, from which current may be collected by a current collector of the bow or pantograph type mounted on a train, which is suspended by droppers 3 from a catenary 2, the contact wire and catenary being supported at spaced positions along their lengths by cantilever structural assemblies 4 located at spaced positions along the length of the track along which the train travels. Each cantilever structural assembly comprises a mast 5 positioned alongside the track and, mounted on an upper part of the mast, a cantilever structure 6 which overhangs the track and from which the contact wire and catenary are suspended. At each section of a plurality of sections along the system, the catenary 2 is maintained under tension by balance weights supported by masts 5 of cantilever structural assemblies 6 at the ends of the section and, to provide for accommodation of out of balance loads to which the catenary in the section may be subjected whilst in service arising from changes in temperature and/or in the wind and/or from differences in level along the length of the system, in order to prevent movement in a direction along the track of the catenary, at approximately the middle region of the section a mid-point anchor is provided which will prevent movement in a direction along the track of the catenary. A known form of mid-point anchor comprises a length 7 of metal cable secured to the catenary 2 on each side of a cantilever structural assembly 4 at approximately the mid point of the section and which extends towards and is secured to the mast 5 of each adjacent cantilever structural assembly 4 from where it extends to a foundation anchor 9 on the side of the adjacent cantilever structural assembly remote from the cantilever structural assembly at the mid-point of the section. Insulators 8 are interconnected in the metal cable 7 on each side of the cantilever structural assembly at the mid-point of the section to insulate the cable from each adjacent cantilever structural assembly.

This known form of mid-point anchor has the disadvantage that the masts of the adjacent cantilever structural assemblies must be substantially heavier than the masts of the other cantilever structural assemblies in order to be capable of withstanding the forces to which they will be subjected and, at each end of the metal cable 7, a foundation anchor 9 must be provided. An additional disadvantage lies in the fact that the length of metal cable 7 extending from the cantilever structural assembly 4 at the mid-point of the section to the foundation anchor 9 can be in the range 40 to 70 meters in length.

In FIGS. 3 to 6 there is illustrated an improved midpoint anchor which is simpler in construction and substantially less expensive than the mid-point anchor illustrated in FIGS. 1 and 2.

Referring to FIGS. 3 to 6, the overhead electric traction system for a railway comprises contact wire 11 suspended from a catenary 12 by droppers 13, the contact wire and catenary being supported at spaced positions along their lengths by cantilever structural assemblies located at spaced positions along the length of the track along which a train travels. Each of the cantilever structural assemblies 14 is of conventional construction except for a cantilever structural assembly 15 at the mid-point of each of a plurality of sections extending along the length of the system where the cantilever structural assembly is modified to form part of the improved mid-point anchor. The improved midpoint anchor comprises a cantilever structural assembly comprising a mast 24 positioned alongside the track and, mounted on an upper part of the mast, a cantilever structure 26 comprising a pair of transversely extending substantially rigid elongate members 31 which lie in a substantially horizontal plane and an inclined strut 32 whose lower end is connected to the mast and whose upper end, which lies above the adjacent track, is connected to the ends of the pair of elongate members. Each of the elongate members 31 is connected at its inner end to an electric insulator 35 which, at its inner end, is pivotally connected about a substantially vertical axis by a fitting 36 to a substantially rigid elongate member 37 which extends lengthwise of the track and which, at each of its end portions, is connected to an angle 41 secured to the mast 24 by a flexible tie 42. At approximately its mid-point, the elongate member 37 is pivotally connected to the mast 24 about a substantially vertical axis by fittings 39 and 40.

At its lowermost end, the inclined strut 32 is connected to an electric insulator 52 which is pivotally connected to the mast 24 about a substantially vertical axis by a fitting 53. The ends of the elongate members 31 and inclined strut 32 remote from the mast 24 are interconnected together by a composite fitting 54.

Secured to the inclined strut 32 near its uppermost end is a fitting 59 for supporting the catenary 12 and, intermediate the ends of the inclined strut is a fitting 55 to which is pivotally mounted about a substantially horizontal axis a substantially rigid registration arm 33. The end of the registration arm 33 remote from the fitting 55 is suspended from the catenary 12 by a flexible tie 61 interconnected between a fitting secured to the catenary 12 and a fitting 60 secured to the registration arm.

Depending from the registration arm 33 near its innermost end is an adjustable drop bracket 56 which carries towards its lower end a bolted clamp 57 to which a steady arm 34 is pivotally connected in such a way that it can swing in a vertical plane. A swivel clip 58 to which the contact wire 11 is secured is mounted on the free end of the steady arm, which free end is suspended from the registration arm 33 by a flexible tie 63 interconnected between the swivel clip and a fitting 62 secured to the registration arm.

In the event of an out of balance load on the contact wire 11 and/or on the catenary 12, pivotal movement of the cantilever structure about the substantially vertical axis between the fittings 39 and 40 is prevented by one of the flexible ties 42 and the out of balance load is transferred to the mast 24 as a torsional load. In the event of a simple break in the contact wire 11 or catenary 12 without the imposition of an increase in torsion before failure, the balance weight auto-stop normally provided will be actuated almost instantaneously. At the instant before the auto-stop is actuated, a difference in tension will be present and this difference in tension will be sufficient to cause one of the flexible ties 42 of the cantilever structure 26 to fail, thus relieving the mast 24 of its torsional load. Damage anticipated from this form of broken wire condition can be slight and is estimated to be confined to within two or three spans. Where a broken contact wire or broken catenary condition is of a form which produces an increase in tension in the wire which exceeds its breaking load before failure—as may be the case where a vehicle "hooks-up" on the contact wire or catenary—one of the flexible ties 42 will fail and the cantilever structure 26 will swing towards the side of increased tension. The increase in tension will be absorbed by the cantilever structure 26 until it has reached its limit of swing when the contact wire 11 or catenary 12 will fail. The balance weight auto-stop will then be actuated almost instantaneously. Damage arising from such a broken contact wire or broken catenary condition will obviously be extensive, but will be no greater than that obtained for the same broken wire condition when mid-point anchors of forms hitherto used are employed.

Referring to FIG. 7, the second preferred form of the improved mid-point anchor for use with an overhead traction system for a railway comprises a mast 125 on the upper end of which is mounted a cantilever structure 126. The cantilever structure 126 comprises a pair of substantially rigid elongate members 131 which lie in a substantially horizontal plane and an inclined strut 132 whose lower end is connected via an electric insulator 152 to the mast. Each elongate member 131 is connected via an electric insulator 135 to an end of a substantially rigid elongate member 137 which extends lengthwise of the track in which, at each of its end portions, is connected to an angle 141 secured to the mast 125 by a flexible tie 142. The elongate member 137 is pivotally connected to the mast 125 about a vertical axis by fitting 140 and each electric insulator 135 at the inner end of an elongate member 131 is pivotally connected about a substantially vertical axis to the elongate member 137 by a fitting 136. The ends of the elongate members 131 remote from the mast 125 are mechanically connected to the upper end of the inclined strut 132 by a composite fitting 170.

At the free ends of the elongate members 131 and inclined strut 132 is a fitting 171 which supports an electric insulator 172 on which is mounted a clamp 173 for twin catenaries 112.

Intermediate the ends of the inclined strut 132, is a fitting 156 to which is pivotally mounted about a substantially horizontal axis a steady arm 134 having at its inner end an electric insulator 164. At the free end of the steady arm 134 is a swivel clip 158 for supporting the contact wire 111.

At an intermediate region of each of the spans adjacent the mid-point anchor, the twin catenaries 112 are connected to the contact wire 111 by flexible ties 165.

The mid-point anchor operates in the same manner as the mid-point anchor illustrated in FIGS. 3 to 6 but, as will be seen, is simpler in construction and, as a consequence, less expensive.

FIG. 8 illustrates a third preferred form of improved mid-point anchor for use in an overhead electrical traction system for a trolleybus or tramcar. This mid-point anchor comprises a pole 225 on the upper part of which is mounted a cantilever structure 226 comprising a pair of substantially rigid elongate members 231 which are indirectly connected to the mast and which lie in a common plane which is inclined to an acute angle to the horizontal and a tie member 232 which connects the upper ends of the pair of inclined elongate members to the mast.

At their inner ends the inclined elongate members 231 are each pivotally connected about a vertical axis via an electric insulator 235 to one end of a substantially rigid elongate member 237 which extends lengthwise of the track and which, at each of its end portions, is connected to an angle 241 secured to the mast 225 by a flexible tie 242. At approximately its mid point, the elongate member 237 is pivotally connected to the mast about a substantially vertical axis by a fitting 240. At the ends of the inclined elongate members 231 remote from the mast 225, the members are interconnected together by a rigid link 267 which extends substantially parallel to the track and flexible tie 232 is interconnected between a fitting 252 connected to the mast 225 and the rigid link 267.

Intermediate of the ends of the inclined elongate members 231 is a substantially rigid elongate member 268 which extends between the members in a direction substantially parallel to the track and from which depends an adjustable drop bracket 256 which carries at its lowermost end a clamp 264 which is pivotally connected to the bracket about a substantially horizontal axis and which is connected to one end of a steady arm 234 which, at its free end, carries a swivel clip 258 supporting the contact wire 211. The contact wire 211 is also supported by flexible ties 212 interconnected between fittings 215 connected to the contact wire and fittings 214 secured to the inclined elongate members 231.

The mid-point anchor illustrated in FIG. 8 operates in substantially the same manner as the mid-point anchors illustrated in FIGS. 3 to 6 and in FIG. 7.

What we claim as our invention is:

1. In an overhead electric traction system in which at least one overhead conductor at longitudinally spaced positions along its length is suspended from cantilever structural assemblies and in which sections of one flexible member of the system, selected from the group of flexible members consisting of said overhead conductor of the system and a catenary, twin catenaries, and a main catenary by which the conductor is supported, are each maintained under tension by balance weights supported by upstanding supports of cantilever structural assemblies at the ends of said section, a mid-point anchor which is positioned at approximately the mid-point of at least one section of the system and which comprises an upstanding support positioned alongside the route of the system and, mounted on an upper part of the upstanding support, a cantilever structure comprising a pair of substantially rigid elongate members which lie in a substantially common plane and extend transversely with respect to and are spaced apart in a direction lengthwise of the route, which at their ends nearer the route are connected to said upstanding support by a third transversely extending elongate member inclined at an acute angle to said common plane, and which at their ends remote from the route are connected to opposite ends of a fourth substantially rigid elongate member which extends lengthwise of the route and which, at each of its end portions, is connected to said upstanding support by an elongate element, the arrangement being such that, in the event of an unbalanced load on said flexible member pivotal movement of the cantilever structure about a substantially vertical axis is prevented by one of the elongate elements and the unbalanced load is transferred to the upstanding support as a torsional load.

2. A mid-point anchor as claimed in claim 1, wherein said pair of transversely extending substantially rigid elongate members of said cantilever structure lie in a substantially horizontal plane and the third transversely extending elongate member is an inclined substantially rigid strut whose lower end is connected to said upstanding support and whose upper end, which lies above the adjacent track, is connected to the ends of the pair of elongate members.

3. A mid-point anchor as claimed in claim 1, wherein said pair of transversely extending substantially rigid elongate members of said cantilever structure lie in a common plane which is inclined at an acute angle to the horizontal, said third transversely extending elongate member is a tie member which connects the upper ends of said pair of inclined members to said upstanding support, and the contact wire is suspended from each elongate member of said pair of elongate members by a tie.

4. A mid-point anchor as claimed in claim 3, wherein the contact wire is attached to one end of a substantially rigid elongate member whose other end is attached to a longitudinally extending substantially rigid elongate member connected between said pair of inclined elongate members intermediate of their ends.

5. A mid-point anchor as claimed in claim 1, wherein an electric insulator is connected between the inner end of each transversely extending substantially rigid elongate member and the longitudinally extending elongate member which is connected to said upstanding support by said elongate elements, and between the inner end of the third transversely extending elongate member and said upstanding support.

* * * * *

UNITED STATES PATENT AND TRADEMARK OFFICE
CERTIFICATE OF CORRECTION

PATENT NO. : 4,679,672

DATED : July 14, 1987

INVENTOR(S) : ALAN E. SEDDON, JOHN DOUGHTY

It is certified that error appears in the above-identified patent and that said Letters Patent is hereby corrected as shown below:

In [57] Abstract, line 5, change "extended" to --extend-- and in line 10, change the first occurrence of "the" to --said--.

Signed and Sealed this

Twenty-fourth Day of November, 1987

Attest:

DONALD J. QUIGG

Attesting Officer

Commissioner of Patents and Trademarks